United States Patent
Li et al.

(10) Patent No.: US 12,521,668 B2
(45) Date of Patent: Jan. 13, 2026

(54) CARBON-CAPTURE SORBENT REGENERATION BY MAGNETIC HEATING OF NANOPARTICLES

(71) Applicant: UT-Battelle, LLC, Oak Ridge, TN (US)

(72) Inventors: Kai Li, Oak Ridge, TN (US); Kashif Nawaz, Oak Ridge, TN (US); Tolga Aytug, Oak Ridge, TN (US); Michael S. Kesler, Oak Ridge, TN (US); Edgar Lara-Curzio, Oak Ridge, TN (US); Michael A. Mcguire, Oak Ridge, TN (US); Zack Tener, Oak Ridge, TN (US); David S. Sholl, Oak Ridge, TN (US); Mingkan Zhang, Oak Ridge, TN (US)

(73) Assignee: UT-BATTELLE, LLC, Oak Ridge, TN (US)

(*) Notice: Subject to any disclaimer, the term of this patent is extended or adjusted under 35 U.S.C. 154(b) by 385 days.

(21) Appl. No.: 18/370,980

(22) Filed: Sep. 21, 2023

(65) Prior Publication Data

US 2025/0099901 A1    Mar. 27, 2025

(51) Int. Cl.
*B01D 53/04* (2006.01)
*B82Y 30/00* (2011.01)

(52) U.S. Cl.
CPC .... *B01D 53/0438* (2013.01); *B01D 2253/102* (2013.01); *B01D 2253/204* (2013.01);
(Continued)

(58) Field of Classification Search
CPC ............... B01D 53/0438; B01D 53/04; B01D 2257/504; B01D 2253/102;
(Continued)

(56) References Cited

U.S. PATENT DOCUMENTS 4,283,204 A * 8/1981 Savage .................. B01D 53/12
                                                    95/143
9,175,591 B2 * 11/2015 Hamad ................. F01N 3/0857
(Continued)

FOREIGN PATENT DOCUMENTS

WO    2022170380 A1    8/2022

OTHER PUBLICATIONS

Sadiq et al., "Engineered Porous Nanocomposites That Deliver Remarkably Low Carbon Capture Energy Costs," Cell Reports Physical Science 1, 100070, 1-12 (2020).
(Continued)

*Primary Examiner* — Frank M Lawrence, Jr.
(74) *Attorney, Agent, or Firm* — WARNER NORCROSS + JUDD LLP

(57) ABSTRACT

A method of carbon-capture sorbent regeneration is provided. The method includes obtaining a sorbent that includes adsorbed carbon dioxide. Magnetic nanoparticles are introduced to the sorbent and adsorbed carbon dioxide to form a mixture. A magnetic field is applied to the mixture. The magnetic nanoparticles generate heat which releases carbon dioxide from the sorbent, thereby regenerating the sorbent. The magnetic nanoparticles include iron oxides, doped ferrites, functionalized iron oxides, functionalized ferrites, and composite materials that are combinations of these. The sorbent includes liquid and solid sorbents, and the regenerated sorbent may be utilized for further carbon capture.

20 Claims, 4 Drawing Sheets

(52) U.S. Cl.
CPC .............. *B01D 2257/504* (2013.01); *B01D 2259/40098* (2013.01); *B01D 2259/814* (2013.01)

(58) Field of Classification Search
CPC ........ B01D 2253/204; B01D 2252/204; B01D 2252/20405; B01D 2252/2041; B01D 2252/20478; B01D 2252/20494; B01D 2252/30; B01D 2259/40098; B01D 2259/814; B01D 53/1425; B01D 53/1475; Y02C 20/40
USPC ... 95/96, 115, 139, 178, 179, 183, 149, 236, 95/27, 28; 423/220, 228–230; 96/1–3, 96/108, 243
See application file for complete search history.

(56) References Cited

U.S. PATENT DOCUMENTS

| | | | |
|---|---|---|---|
| 10,583,387 | B2 | 3/2020 | Custelcean et al. |
| 12,350,623 | B1* | 7/2025 | Sangaru ................ B01D 53/62 |
| 2008/0307960 | A1* | 12/2008 | Hendrickson ...... B01J 20/28057 |
| | | | 502/411 |
| 2012/0207659 | A1 | 8/2012 | Pinard et al. |
| 2014/0099245 | A1* | 4/2014 | Hamad ................ B01D 53/62 |
| | | | 96/242 |
| 2018/0268972 | A1* | 9/2018 | Hesampour .............. C09D 4/00 |
| 2020/0282379 | A1* | 9/2020 | Mulet .................... B01J 20/103 |
| 2021/0346863 | A1 | 11/2021 | Paranthaman et al. |
| 2023/0302399 | A1* | 9/2023 | Karousos ........... B01D 53/1425 |

OTHER PUBLICATIONS

Li et al., "Magnetic Metal-Organic Frameworks for Efficient Carbon Dioxide Capture and Remote Trigger Release," Advanced Materials 28, 1839-1844 (2016).

Sadiq et al., "Magnetic Induction Swing Adsorption: An Energy Efficient Route to Porous Adsorbent Regeneration," Chemistry of Materials 28, 6219-6226 (2016).

International Search Report of the International Searching Authority for application No. PCT/US2024/046183, dated Dec. 9, 2024 (1 page).

Gholami et al. "Induction Heating as an Alternative Electrified Heating Method for Carbon Capture Process", Chemical Engineering Journal 431, 133380 (2022).

Zielinski et al., "Influence of Static Magnetic Field on Sludge Properties", Science of Total Environment 625, 738-742 (2018).

* cited by examiner

CARBON-CAPTURE SORBENT REGENERATION BY MAGNETIC HEATING OF NANOPARTICLES

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to regeneration of sorbents used in the removal of carbon dioxide ("carbon capture") from the atmosphere and point sources.

BACKGROUND OF THE INVENTION

The level of greenhouse gases (primarily water vapor, carbon dioxide, methane, nitrous oxide, and ozone) in the atmosphere is important due to its effect on Earth's average surface temperature. Increased carbon dioxide ($CO_2$) production and emission in the last 300 years has been one of the largest culprits in the rising level of atmospheric greenhouse gases, which threatens to increase the average surface temperature on Earth. In fact, $CO_2$ is the largest contributor to global warming and climate change, and by certain estimates its atmospheric concentration has risen to 48% above its pre-industrial level. The global anthropogenic $CO_2$ emission in 2018 was nearly $3.3 \times 10^{10}$ ton, and currently the atmospheric concentration is nearly 416 ppm. According to reports, by the year 2100 the concentration of $CO_2$ could reach 570 ppm, resulting in a temperature rise of 1.9° C. and an increase in sea level by 3.8 m.

Significant efforts have been devoted to carbon dioxide removal from the air and reduction of carbon dioxide emissions. A variety of technologies have been utilized for capture of carbon dioxide before it enters the atmosphere, which is generally referred to as point source capture. For example, carbon dioxide can be captured from concentrated flue gas streams at industrial chemical plants and biomass power plants, thereby reducing $CO_2$ emissions into the atmosphere. Despite these efforts, there remains a need to reduce the level of carbon dioxide that is present in ambient air due to daily $CO_2$ emissions from various sources. Direct air capture (DAC) of carbon dioxide is an alternative to point source capture. Direct air capture involves directly pulling carbon dioxide out of the ambient air/atmosphere and can be useful to reduce atmospheric levels of carbon dioxide gas that cannot be controlled by other means such as point source capture, reduced carbon dioxide generation/emission, and reduced deforestation.

Capture of carbon dioxide, either point source capture, direct air capture, or otherwise, typically is based on a sorption mechanism, including chemisorption and physisorption, that utilize a sorbent that adsorbs carbon dioxide gas. In chemisorption, the sorbent, such as hydroxides and amines solvents, chemically bonds with $CO_2$. However, the high binding energy also causes high energy consumption during the regeneration, in which the carbon dioxide is separated from the sorbent and collected for use and/or disposal. On the other hand, in physisorption the regeneration of the sorbents is relatively easier than with chemisorbed materials because of the weaker bonds between $CO_2$ and the physisorption sorbent. Further, at present the regeneration of the sorbent mainly relies on temperature swing adsorption and pressure swing adsorption. However, the energy intensiveness of these processes for regenerating the sorbent in carbon capture systems is a significant limiting factor for implementation of carbon capture. Another limiting factor for sorbent regeneration is the low thermal conductivity of most sorbents, which results in low heat transfer efficiency when thermal heating is used for regeneration. Therefore, a need exists for an efficient, low-cost method of regenerating carbon-capture sorbents.

SUMMARY OF THE INVENTION

A method of carbon-capture sorbent regeneration is provided. The method utilizes magnetic heating as a source of energy to regenerate carbon-capture sorbents. The method includes obtaining a sorbent that includes adsorbed carbon dioxide. Magnetic nanoparticles are introduced to the sorbent and adsorbed carbon dioxide to form a mixture. A magnetic field is applied to the mixture. Under the magnetic field, the magnetic nanoparticles generate heat through several mechanism, such as hysteresis loop mechanism, Néel relaxation, Brownian motion, and/or particle-particle interaction. Since magnetic nanoparticles can be directly heated by an external magnetic field, i.e. magnetic heating, the captured/adsorbed carbon dioxide is released from the sorbent due to the rise in temperature, thus regenerating the sorbent. The method is capable of significantly reducing the energy cost of carbon-capture sorbent regeneration and overcoming the low thermal conductivity of sorbent materials, enabling efficient, rapid, and uniform heat transfer for sorbent regeneration. Additionally, the method can be applied in a non-contact manner via electromagnetic waves, allowing the method to be easily adopted into existing carbon capture systems.

In specific embodiments, the magnetic nanoparticles include one or more of: (i) an iron oxide; (ii) a doped ferrite; (iii) a functionalized iron oxide; (iv) a functionalized ferrite; and (v) a composite material that is a combination of two or more of (i) through (iv).

In specific embodiments, the magnetic nanoparticles include an iron oxide selected from a group consisting of: (i) $Fe_3O_4$; (ii) FeO; (iii) $\alpha$-$Fe_2O_3$; and (iv) $\gamma$-$Fe_2O_3$.

In specific embodiments, the sorbent is a liquid or a solid material.

In certain embodiments, the sorbent is a liquid that includes one of: (i) diethanolamine (DEA); (ii) monoethanolamine (MEA); (iii) methyldiethanolamine (MDEA); (iv) diisopropanolamine (DIPA); (v) aminoethoxyethanol (diglycolamine) (DGA); (vi) an amino acid; (vii) an ionic liquid; and (viii) any combination of two or more of (i) through (vii).

In specific embodiments, the sorbent is a solid material that includes one of: (i) a covalent organic framework; (ii) a metal-organic framework; (iii) an activated carbon; (iv) an amine functionalized material; (v) a membrane material; and (vi) any combination of two or more of (i) through (v).

In specific embodiments, the sorbent is a liquid, and the mixture includes the magnetic nanoparticles suspended in the liquid.

In specific embodiments, the sorbent is a porous solid material, and the magnetic particles are mixed into the pores of the solid material.

In specific embodiments, the magnetic field is an alternating current magnetic field.

In specific embodiments, the method further includes the step of applying a static magnetic field to the mixture to coagulate the magnetic nanoparticles.

In specific embodiments, the method further includes the step of collecting the carbon dioxide released from the sorbent.

In specific embodiments, the regenerated sorbent is utilized for carbon capture.

In specific embodiments, the method further includes one or both of: (i) applying additional heat from an external source to the mixture; and (ii) applying a vacuum to the mixture, in conjunction with the step of applying a magnetic field to the mixture.

A method of carbon capture including sorbent regeneration is also provided. The method includes: (a) providing a sorbent; (b) introducing a flow of gas to the sorbent, the gas including carbon dioxide, wherein the sorbent adsorbs the carbon dioxide; (c) subsequent to the sorbent adsorbing carbon dioxide, introducing magnetic nanoparticles to the sorbent and adsorbed carbon dioxide to form a mixture; and (d) applying a magnetic field to the mixture. The magnetic nanoparticles generate heat which releases the carbon dioxide from the sorbent, thereby regenerating the sorbent.

In specific embodiments, the method includes repeating steps (a) through (c) subsequent to step (d), wherein the sorbent in repeated step (1) is the regenerated sorbent.

In specific embodiments, the method includes the step of: (e) collecting the carbon dioxide released from the sorbent.

In specific embodiments, the magnetic nanoparticles include one or more of: (i) an iron oxide; (ii) a doped ferrite; (iii) a functionalized iron oxide; (iv) a functionalized ferrite; and (v) a composite material that is a combination of two or more of (i) through (iv).

In specific embodiments, the sorbent is a liquid that includes one of: (i) diethanolamine (DEA); (ii) monoethanolamine (MEA); (iii) methyldiethanolamine (MDEA); (iv) diisopropanolamine (DIPA); (v) aminoethoxyethanol (diglycolamine) (DGA); (vi) an amino acid; (vii) an ionic liquid; and (viii) any combination of two or more of (i) through (vii).

In specific embodiments, the sorbent is a solid material that includes one of: (i) a covalent organic framework; (ii) a metal-organic framework; (iii) activated carbon; (iv) an amine functionalized material; (v) a membrane material; and (vi) any combination of two or more of (i) through (v).

In specific embodiments, the magnetic field in step (d) is an alternating current magnetic field, and subsequent to regenerating the sorbent in step (d), the method further includes the step of: (f) applying a static magnetic field to the mixture to coagulate the magnetic nanoparticles.

These and other features of the invention will be more fully understood and appreciated by reference to the description of the embodiments and the drawings.

DETAILED DESCRIPTION OF THE CURRENT EMBODIMENTS

As discussed herein, the current embodiments relate to a method of carbon capture and carbon-capture sorbent regeneration. The method may be implemented into an existing carbon capture system to regenerate the carbon-capture sorbent, may be incorporated into a new carbon capture system, or may be applied to regenerate carbon-capture sorbents separately from the carbon capture system. The method is capable of increasing the efficiency of and reducing the energy use and associated costs of regenerating sorbents used in carbon capture systems.

Figure 1:
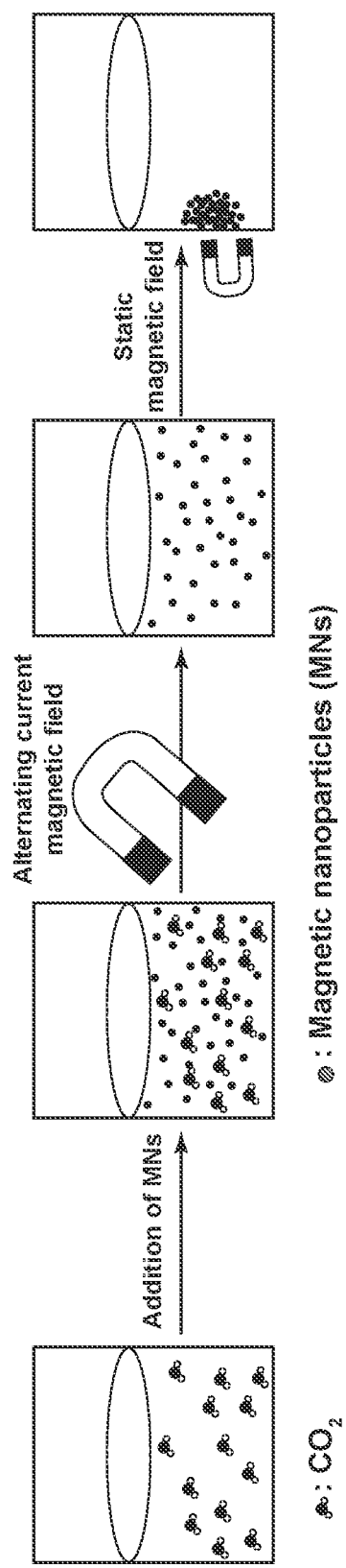
FIG. 1 is a schematic view of a method of carbon-capture sorbent regeneration of a liquid sorbent in accordance with some embodiments of the disclosure.
Figure 2:
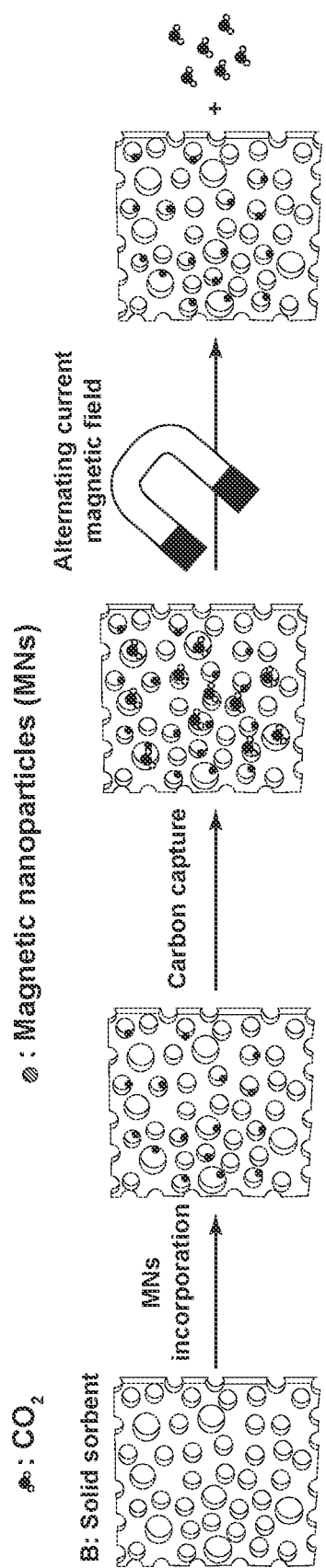
FIG. 2 is a schematic view of a method of carbon-capture sorbent regeneration of a solid sorbent in accordance with some embodiments of the disclosure.

As shown by example in FIGS. 1 and 2, the method first includes obtaining a sorbent that includes adsorbed carbon dioxide (hereinafter also referred to as simply "carbon"). The sorbent with adsorbed carbon may be located within a carbon capture system, in which the sorbent with adsorbed carbon is obtained directly within a carbon capture system, i.e. the sorbent is not removed from the system. Alternatively, the sorbent with adsorbed carbon may be acquired from a carbon capture system and thus moved to a location separate from the carbon capture system. Such could be the case with a liquid sorbent. However, while not intended to be limiting, it should be understood that from a practical standpoint the method is preferably implemented into a new or existing carbon capture system such that the sorbent with adsorbed carbon is obtained within the system via the normal course of operation of the carbon capture process in which carbon dioxide is removed from a gas stream by a sorbent. The sorbent has a limited capacity to absorb carbon dioxide and is thus required to be regenerated to release and collect the carbon dioxide for further use or proper disposal, so that the sorbent can be used for further carbon capture.

The sorbent is not particularly limited and may be a liquid sorbent or a solid sorbent. By way of example, in the case of a liquid sorbent, the sorbent may include one or more of diethanolamine (DEA), monoethanolamine (MEA), methyldiethanolamine (MDEA), diisopropanolamine (DIPA), aminoethoxyethanol (diglycolamine) (DGA), an amino acid, and/or an ionic liquid. The liquid sorbent is put into contact with a flow of gas that includes carbon dioxide, such as by exposing a flow of the liquid solvent to a crossflow of the gas stream. In the case of a solid sorbent, the solid material forming the sorbent may include one or more of a covalent organic framework, a metal-organic framework, an activated carbon, an amine functionalized material, and a membrane material. The solid sorbent may be disposed in bed of material through which a gas stream is fed, or the solid sorbent may be a porous material in which the gas stream is passed through the pores of the solid material.

The method next includes introducing magnetic nanoparticles to the sorbent and adsorbed carbon dioxide to form a mixture. The magnetic nanoparticles may be added to the sorbent for the first time, alternatively may be present from previous carbon capture and regeneration cycles, or as described below, may be removed from and returned to the sorbent/mixture as needed for regeneration. In the case of liquid sorbents, the magnetic particles may be mixed with the sorbent to form a suspension in which the magnetic nanoparticles are suspended in the liquid sorbent. In the case of a solid sorbent, the magnetic nanoparticles can be mixed with solid sorbent particles, or the magnetic nanoparticles may be mixed with a porous solid sorbent material such that the magnetic nanoparticles become impregnated and dispersed within the pores of the solid sorbent material. The magnetic nanoparticles may be an iron oxide, a doped ferrite, a functionalized iron oxide, a functionalized ferrite, or a composite material that is a combination of two or more these individual materials. In certain embodiments, the magnetic nanoparticles are particularly an iron oxide such as but not limited to $Fe_3O_4$, FeO, $\alpha$-$Fe_2O_3$, and $\gamma$-$Fe_2O_3$.

The method next includes applying a magnetic field to the mixture of sorbent (with adsorbed carbon) and magnetic nanoparticles. The magnetic field may be, for example, an alternating current magnetic field, that excites the magnetic nanoparticles, causing the magnetic nanoparticles to generate heat. The magnetic nanoparticles are generally evenly dispersed throughout the sorbent, and the heat generated warms sorbent and more particularly the adsorbed carbon dioxide to sever the adsorptive bonds/interaction between the carbon dioxide and the sorbent such that the carbon dioxide is released from the sorbent. The released carbon dioxide is then collected such as in a storage vessel so the carbon dioxide is removed from and/or not released into the environment. After all or a sufficient amount of the carbon dioxide is released from the sorbent, the regenerated sorbent can be used for further carbon capture in a cyclical process of carbon adsorption and carbon release via application of the electromagnetic field.

In particular embodiments, the method may further include applying a static magnetic field to the sorbent and dispersed magnetic nanoparticles to cause the magnetic nanoparticles to coagulate in one portion of the sorbent. For example, as shown in FIG. 1, in the case that the sorbent is a liquid, activation of the static magnetic field causes the magnetic nanoparticles to come out of suspension and to coagulate towards the source of the static magnetic field. The activation/deactivation of the static magnetic field can be used to remove the magnetic nanoparticles from the bulk of the liquid sorbent during periods when the sorbent is actively adsorbing carbon dioxide, and to reintroduce the magnetic nanoparticles to the liquid sorbent during periods when the liquid sorbent is to be regenerated by application of the alternating current magnetic field to generate heat throughout the sorbent.

Figure 3:
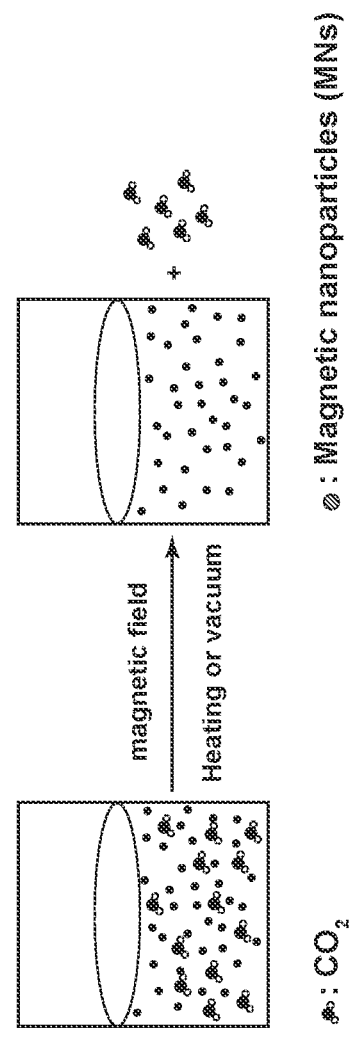
FIG. 3 is a schematic view of a method of carbon-capture sorbent regeneration of a liquid sorbent in accordance with other embodiments of the disclosure.
Figure 4:
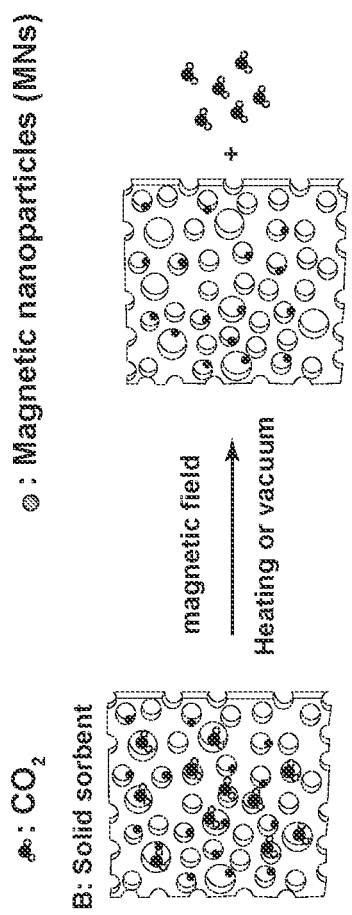
FIG. 4 is a schematic view of a method of carbon-capture sorbent regeneration of a solid sorbent in accordance with other embodiments of the disclosure.

Turning to FIGS. 3 and 4, in alternative embodiments the method may further include applying heat from an external source (i.e., as in conventional temperature swing adsorption) and/or applying vacuum pressure (i.e., as in conventional vacuum swing adsorption) in addition to and in conjunction with applying a magnetic field to heat the nanoparticles. In other words, these embodiments a hybrid approach is taken in which magnetic field regeneration is coupled with temperature swing or vacuum swing to regenerate the sorbent for further carbon capture. Due to the coupling of magnetic field regeneration as described above with the application of a vacuum or additional heat allows for a lower amount of thermal energy and/or less vacuum pressure to be applied in comparison to conventional processes using only heat or vacuum, i.e. no application of a magnetic field.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of carbon-capture sorbent regeneration, the method comprising:
   obtaining a sorbent that includes adsorbed carbon dioxide;
   introducing magnetic nanoparticles to the sorbent and adsorbed carbon dioxide to form a mixture; and
   applying a magnetic field to the mixture;
   wherein the magnetic nanoparticles generate heat which releases carbon dioxide from the sorbent, thereby regenerating the sorbent.

2. The method of claim 1, wherein the magnetic nanoparticles include one or more of: (i) an iron oxide; (ii) a doped ferrite; (iii) a functionalized iron oxide; (iv) a functionalized ferrite; and (v) a composite material that is a combination of two or more of (i) through (iv).

3. The method of claim 1, wherein the magnetic nanoparticles include an iron oxide selected from a group consisting of: (i) $Fe_3O_4$; (ii) FeO; (iii) $\alpha$-$Fe_2O_3$; and (iv) $\gamma$-$Fe_2O_3$.

4. The method of claim 1, wherein the sorbent is a liquid or a solid material.

5. The method of claim 4, wherein the sorbent is a liquid that includes one of: (i) diethanolamine (DEA); (ii) monoethanolamine (MEA); (iii) methyldiethanolamine (MDEA); (iv) diisopropanolamine (DIPA); (v) aminoethoxyethanol (diglycolamine) (DGA); (vi) an amino acid; (vii) an ionic liquid; and (viii) any combination of two or more of (i) through (vii).

6. The method of claim 1, wherein the sorbent is a solid material that includes one of: (i) a covalent organic framework; (ii) a metal-organic framework; (iii) an activated carbon; (iv) an amine functionalized material; (v) a membrane material; and (vi) any combination of two or more of (i) through (v).

7. The method of claim 1, wherein the sorbent is a liquid, and the mixture includes the magnetic nanoparticles suspended in the liquid.

8. The method of claim 1, wherein the sorbent is a porous solid material, and the magnetic particles are mixed into the pores of the solid material.

9. The method of claim 1, wherein the magnetic field is an alternating current magnetic field.

10. The method of claim 1, further including the step of applying a static magnetic field to the mixture to coagulate the magnetic nanoparticles.

11. The method of claim 1, further including the step of collecting the carbon dioxide released from the sorbent.

12. The method of claim 1, wherein the regenerated sorbent is utilized for carbon capture.

13. The method of claim 1, wherein in conjunction with the step of applying a magnetic field to the mixture, further including one or both of: (i) applying additional heat from an external source to the mixture; and (ii) applying a vacuum to the mixture.

14. A method of carbon capture including sorbent regeneration, the method including:
(a) providing a sorbent;
(b) introducing a flow of gas to the sorbent, the gas including carbon dioxide, wherein the sorbent adsorbs the carbon dioxide;
(c) subsequent to the sorbent adsorbing carbon dioxide, introducing magnetic nanoparticles to the sorbent and adsorbed carbon dioxide to form a mixture; and
(d) applying a magnetic field to the mixture;
wherein the magnetic nanoparticles generate heat which releases the carbon dioxide from the sorbent, thereby regenerating the sorbent.

15. The method of claim 14, including repeating steps (a) through (c) subsequent to step (d), wherein the sorbent in repeated step (1) is the regenerated sorbent.

16. The method of claim 14, further including the step of:
(e) collecting the carbon dioxide released from the sorbent.

17. The method of claim 14, wherein the magnetic nanoparticles include one or more of: (i) an iron oxide; (ii) a doped ferrite; (iii) a functionalized iron oxide; (iv) a functionalized ferrite; and (v) a composite material that is a combination of two or more of (i) through (iv).

18. The method of claim 14, wherein the sorbent is a liquid that includes one of: (i) diethanolamine (DEA); (ii) monoethanolamine (MEA); (iii) methyldiethanolamine (MDEA); (iv) diisopropanolamine (DIPA); (v) aminoethoxyethanol (diglycolamine) (DGA); (vi) an amino acid; (vii) an ionic liquid; and (viii) any combination of two or more of (i) through (vii).

19. The method of claim 14, wherein the sorbent is a solid material that includes one of: (i) a covalent organic framework; (ii) a metal-organic framework; (iii) activated carbon; (iv) an amine functionalized material; (v) a membrane material; and (vi) any combination of two or more of (i) through (v).

20. The method of claim 14, wherein the magnetic field in step (d) is an alternating current magnetic field, and subsequent to regenerating the sorbent in step (d), further including the step of: (f) applying a static magnetic field to the mixture to coagulate the magnetic nanoparticles.

* * * * *